United States Patent [19]

Sasaki et al.

[11] Patent Number: 5,140,237
[45] Date of Patent: Aug. 18, 1992

[54] COMPUTERIZED NUMERICAL CONTROL METHOD

[75] Inventors: Takao Sasaki, Hachioji; Kentaro Fujibayashi, Musashino; Ken Yasuda, Minamitsuru, all of Japan

[73] Assignee: Fanuc Ltd., Minamitsuru, Japan

[21] Appl. No.: 536,550

[22] PCT Filed: Nov. 7, 1989

[86] PCT No.: PCT/JP89/01144
§ 371 Date: Jul. 10, 1990
§ 102(e) Date: Jul. 10, 1990

[87] PCT Pub. No.: WO90/06542
PCT Pub. Date: Jun. 14, 1990

[30] Foreign Application Priority Data

Nov. 29, 1988 [JP] Japan .................. 63-301832

[51] Int. Cl.$^5$ .................................... G05B 19/18
[52] U.S. Cl. ........................... 318/568.11; 318/569; 318/572; 364/474.27; 364/400
[58] Field of Search ............... 318/560–646; 364/474.23, 474.3, 474.27, 513

[56] References Cited

U.S. PATENT DOCUMENTS

| | | | |
|---|---|---|---|
| 4,029,950 | 6/1977 | Haga | 364/474.23 |
| 4,109,188 | 8/1978 | Shima et al. | 318/602 |
| 4,396,984 | 8/1983 | Videki II | 364/200 |
| 4,400,118 | 8/1983 | Yamakage et al. | 318/571 X |
| 4,530,046 | 7/1985 | Munekata et al. | 318/568.1 X |
| 4,534,685 | 8/1985 | Komiya et al. | 318/578 X |
| 4,596,066 | 6/1986 | Inoue | 29/568 |
| 4,633,385 | 12/1986 | Murata et al. | 901/6 X |
| 4,787,049 | 11/1988 | Hirata et al. | 364/474.23 |
| 4,788,481 | 11/1988 | Niwa | 318/600 |
| 4,789,931 | 12/1988 | Kuragano et al. | 318/572 |
| 4,902,951 | 2/1990 | Ohta et al. | 318/632 |
| 4,931,709 | 6/1990 | Ikeda et al. | 318/567 |
| 4,961,041 | 10/1990 | Seki et al. | 318/578 |

*Primary Examiner*—Paul Ip
*Attorney, Agent, or Firm*—Staas & Halsey

[57] ABSTRACT

A CNC method controls a plurality of paths with a single computerized numerical control apparatus. In the CNC method, an order (6) in which to execute part programs (5) for the respective paths (4) is designated, and the part programs (5) are sequentially executed in the designated order. The contents of the part programs (5) can thus be checked for each of the part programs.

2 Claims, 3 Drawing Sheets

COMPUTERIZED NUMERICAL CONTROL METHOD

BACKGROUND OF THE INVENTION

1. Field of the Invention

The present invention relates to a computerized numerical control (CNC) method of controlling a plurality of paths with a single computerized numerical control apparatus, and more particularly to a CNC method of sequentially executing part programs for respective paths.

2. Description of the Related Art

There has recently been used a multipath control method which controls a plurality of paths with a single computerized numerical control (CNC) apparatus in order that the CNC apparatus can operate with more functions and a workpiece can be machined in a shorter period of time.

In computerized numerical control apparatus controlled by the multipath control method, part programs for respective paths are generally executed simultaneously, i.e., parallel to each other.

It is however difficult or even practically impossible to check the part programs which are executed parallel to each other.

SUMMARY OF THE INVENTION

In view of the aforesaid problems of the conventional CNC method, it is an object of the present invention to provide a CNC method which can sequentially execute part programs for respective paths.

To achieve the above object, there is provided in accordance with the present invention a CNC method of controlling a plurality of paths with a single computerized numerical control apparatus, the method comprising the steps of designating an order in which to execute part programs for the respective paths, and sequentially executing the part programs for the respective paths in the designated order.

The part programs for the respective paths are designated in a certain order in which they are to be executed. The part programs are then executed in the designated order, and contents thereof are checked for each of the part programs.

If necessary an actual order may be modified.

DESCRIPTION OF THE PREFERRED EMBODIMENT

An embodiment of the present invention will hereinafter be described with reference to the drawings.

Figure 1:
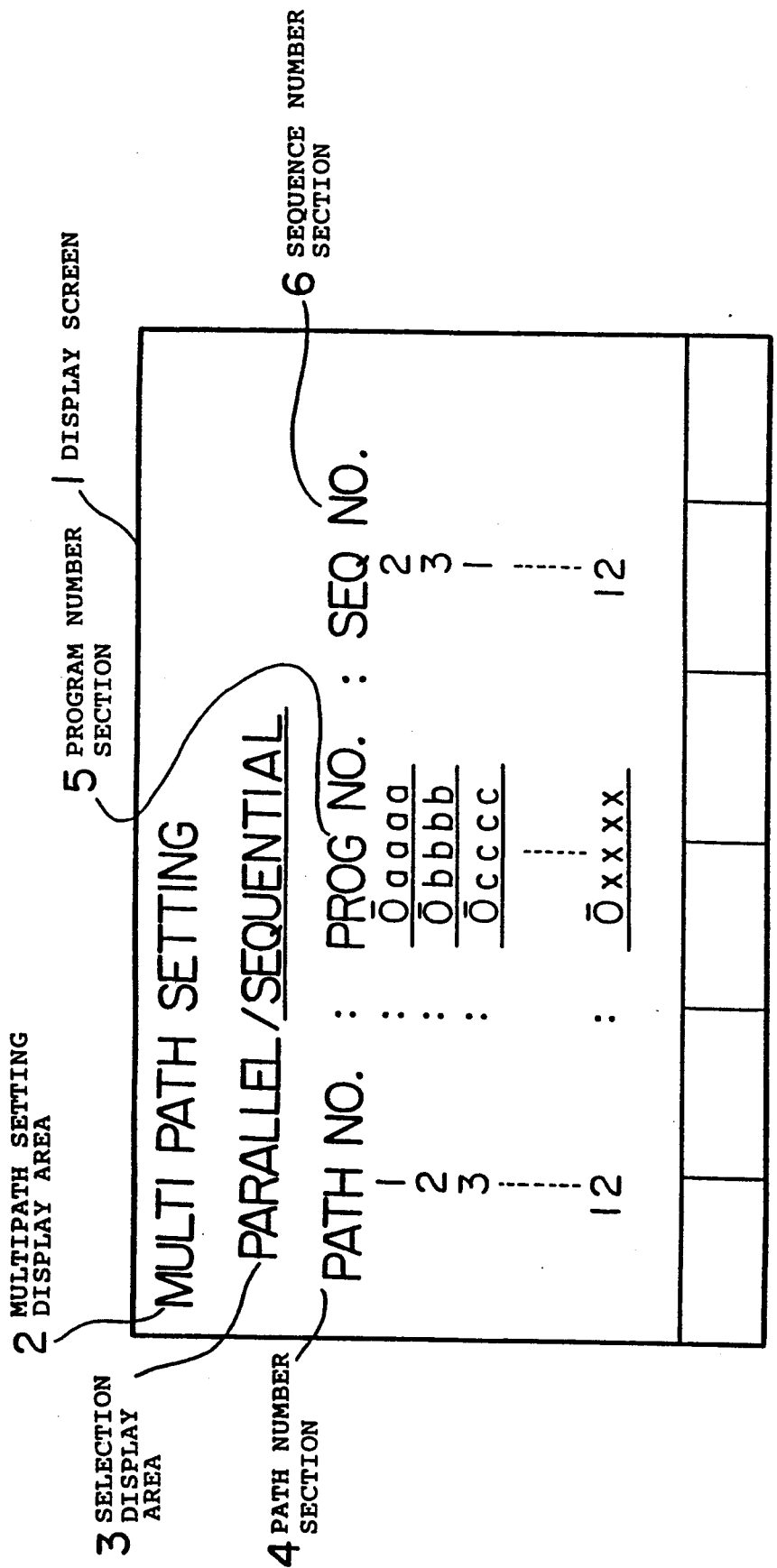
FIG. 1 is a view showing a display screen used in a CNC method according to the present invention.

FIG. 1 shows a display screen used in a CNC method according to the present invention. A CRT/MDI unit has a display screen 1 which includes a multipath setting display area 2, and a selection display area 3 for selecting a parallel execution mode or a sequential execution mode. In FIG. 1, a parallel execution mode is selected, and the selection of the parallel execution mode is indicated by an underline which is displayed.

In a normal machining process, part programs for respective paths are executed simultaneously parallel to each other to machine a plurality of workpieces at the same time. At times, one workpiece may be machined simultaneously by a number of machining heads and corresponding part programs. If the part programs were executed as they are, the part programs would be simultaneously executed, and any checking of these part programs would be practically impossible to carry out.

According to the present invention, a selection capability is provided which allows the part programs for respective paths to be sequentially executed. The selection capability displays a path number section 4 for displaying path numbers, a program number section 5 for displaying the part programs for the paths, such as Oaaaa, Obbbb, Occcc, and so on, and a sequence number section 6 for setting an order in which to execute the part programs.

In the selection display area 3, a sequential execution mode is selected, and an order in which to execute the part programs is preset in the sequence number section 6. According to the preset order, a computerized numerical control apparatus does not execute the part programs parallel to each other, but executes the part programs in the order set in the sequence execution section 6. As a result, the programmer can confirm the contents of the part programs while they are being executed one by one. Furthermore, the programmer can correct errors in the part programs, if necessary, and can also vary the parallel execution order or the like.

Figure 2:
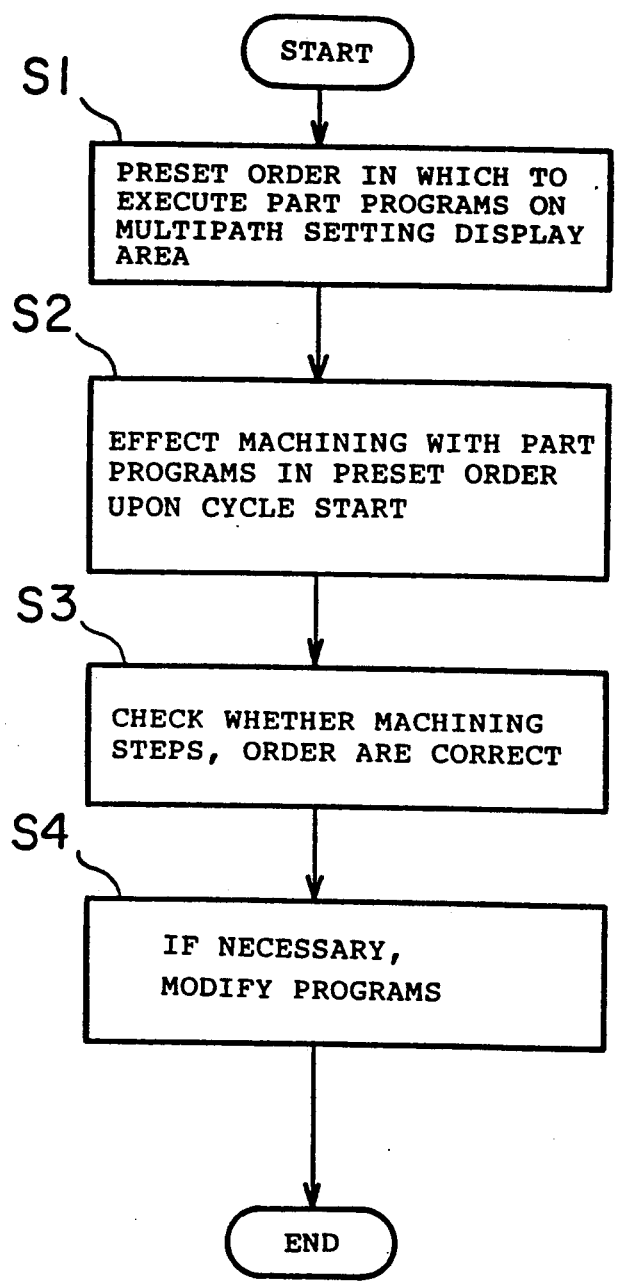
FIG. 2 is a flowchart of a sequence of the CNC method of the present invention.

FIG. 2 shows a sequence of the CNC method according to the present invention. The numerals following a letter "S" in FIG. 2 indicate step numbers.

[S1] A sequential execution mode is selected and an order in which to execute the part programs for the paths is preset on the multipath setting display screen.

[S2] When a cycle start button is pushed, the part programs for the respective paths are executed in the preset order.

[S3] Whether the contents, steps, and order of machining processes are correct or not is checked.

[S4] If there is an error, the contents of the part programs are corrected, and the order in which the part programs are executed parallel to each other is varied.

In this manner, the contents of the part programs for the respective paths can be corrected, and the order in which the part programs are to be executed parallel to each other can be varied so as to be optimum.

Figure 3:
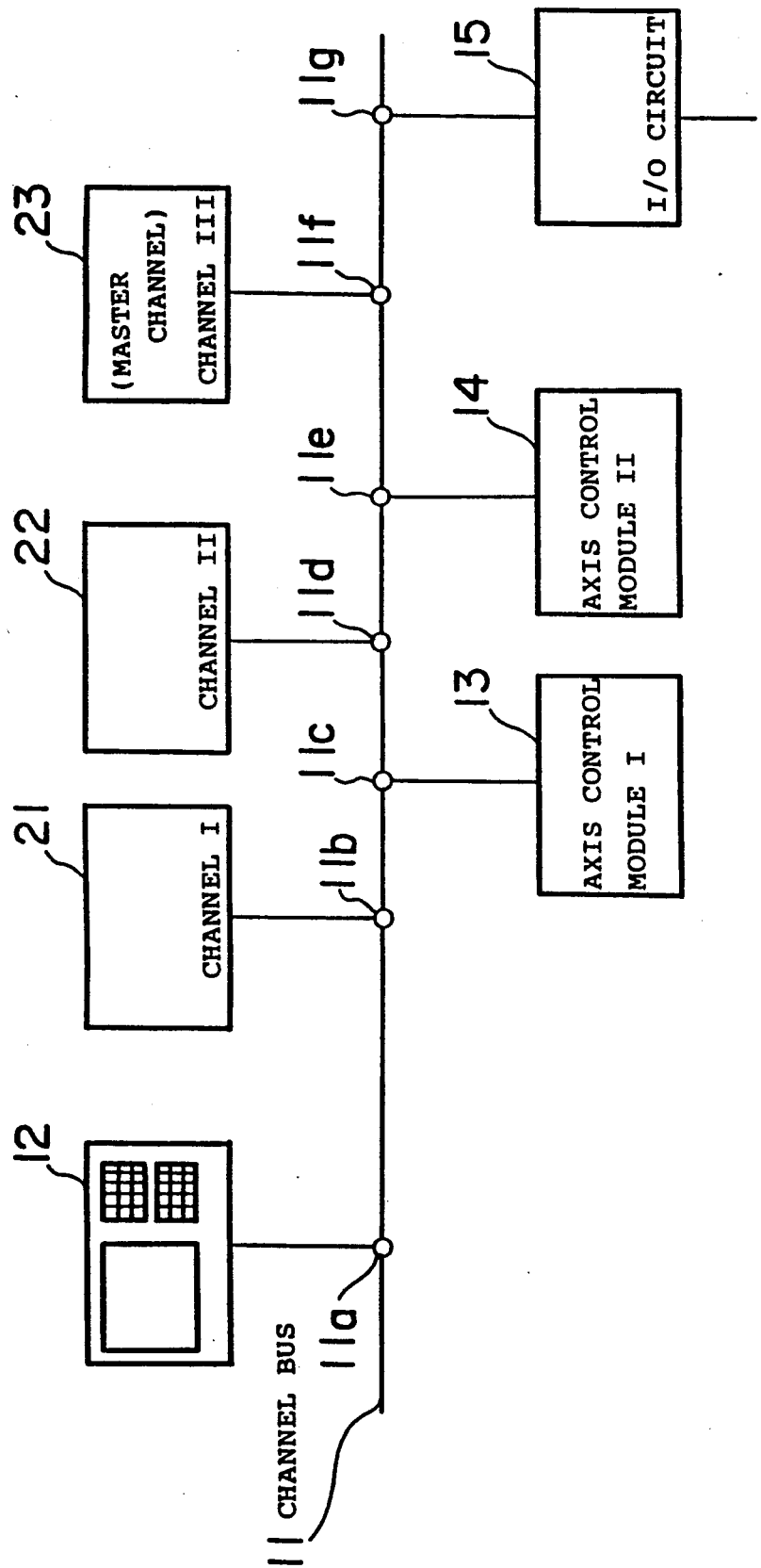
FIG. 3 is a block diagram of the hardware of a computerized numerical control apparatus for multipath control according to the present invention.

FIG. 3 shows in block form the hardware of the computerized numerical control apparatus for multipath control according to the present invention. Designated at 11 is a channel bus which comprises a multimaster bus which can connect channels. The channel bus 11 has a number of slots 11a, 11b, . . . 11g to which channels and other units (described later) can be connected.

The CRT/MDI unit, denoted at 12, displays the multipath setting display screen, and enters an order in which to execute the part programs for the respective paths, through a keyboard. The reference numerals 13, 14 indicate axis control modules each capable of controlling servomotors for 2 or 3 axes. An I/0 circuit 15 receives input signals from and transmits output signals to an external circuit. A PC (programmable controller) is omitted from illustration in FIG. 3.

Denoted at 21, 22, 23 are channels, each having the function of one computerized numerical control apparatus. Therefore, one channel can read, decode, and execute numerical control commands, and can also control devices such as the CRT/MDI unit. Consequently, each of the channels can execute commands for a certain number of axes, which have heretofore been executed by a conventional computerized numerical control apparatus.

On a two-head numerical control engine lathe, for example, a first spindle, an X1 axis, and a Z1 axis are controlled by the channel I 21, a second spindle, an X2 axis, and a Z2 axis are controlled by the channel II 22, and the channel III 23 is used as a master channel for controlling overall operation such as supervising of the other channels. The channel I 21 controls the CRT/MDI unit 12 through the channel bus 11.

These channels 21 through 23 are coupled to the channel bus 11 and share the executing operation. If the executing capacity of one of the channels runs low, part of the operation to be executed is transferred to the other channels. For example, while the channel I 21 is executing interpolation at very small intervals, and the channel II 22 is executing linear interpolation, then part of calculations in advance of the interpolation to be executed by the channel I 21 can be executed by the channel II 22. As a result, the executing capacities of these channels can be balanced so that no unbalanced execution by these channels will take place.

The channel III 23 operates as a master channel to execute overall control processes such as the regulation of priority to use the channel bus 11 and the supervision of the other channels. Of course, the channel III 23 can also control the spindles and the axes. If the channel III 23 is given so many tasks that it can no longer effect the overall control processes and also if the other channels have a sufficient executing capacity, then it is possible to transfer the master right to the other channels.

With the present invention, as described above, since the part programs for the respective paths are sequentially executed in the designated order, they can successively be checked to determine whether they are properly prepared.

The present invention is also effective to determine whether the order in which to execute the paths is optimum or not.

What is claimed is:

1. A CNC method of controlling a plurality of paths machined by a multi-head numerical control engine lathe, using a single computerized numerical control apparatus, said method comprising the steps of:
    (a) storing a plurality of part programs, corresponding to the plurality of paths, for parallel execution by the single computerized numerical control apparatus;
    (b) designating on a display screen an order in which to execute the path programs for respective paths;
    (c) sequentially executing the part programs for the respective paths in the order designated in step (b);
    (d) checking the part programs in dependence upon said executing in step (c);
    (e) correcting any errors in the part programs detected during said checking in step (d); and
    (f) machining a workpiece by parallel execution of the part programs after performing steps (a)–(e).

2. A CNC method according to claim 1, wherein the multi-head numerical control engine lathe is a two-head numerical control engine lathe.

* * * * *